United States Patent Office 2,787,577
Patented Apr. 2, 1957

2,787,577

STABLE SMALLPOX VACCINE

Howard C. Allisbaugh, Indianapolis, Ind., assignor to Eli Lilly and Company, Indianapolis, Ind., a corporation of Indiana No Drawing. Application December 1, 1953, Serial No. 395,583

6 Claims. (Cl. 167—78)

This invention relates to smallpox vaccines. It has to do with providing a smallpox vaccine that is of relatively greater stability or viability-preserving character than those heretofore provided, and one which is less expensive in its preparation, handling and storage aspects.

Smallpox vaccines are compounded generally by admixing and suspending the smallpox vaccine pulp in a viability-preserving, aqueous glycerin diluent. While the glycerin component of such vaccines has a fairly effective germicidal and bacteriostatic range with respect to the bacteria contaminants normally present in such vaccines, it has, nevertheless, generally been deemed necessary in order to assure a satisfactorily bacteria-free product, to implement the sterilizing effect of the glycerin with a more active agent such as phenol or the like.

In handling these preparations it is necessary, in order to maintain their normal life expectancy at the required potency level, to substantially, forthwith upon their production, provide and continuously maintain a special low-temperature environment for the product until the time of its use. Whereas, normally, biologicals, for the most part, require storage temperatures of the order of only +5° C. and demand no special temperatures during shipment, these glycerinated vaccine products require storage temperatures of about —50° C., and this during transit as well as in storage. The transit temperature is usually maintained by the relatively expensive procedure of especially packing the containers with Dry Ice or using other transportable refrigerating means. Even when such special refrigeration requirements are fully met, these glycerinated vaccine products have a relatively short usable life, much of the vaccine having periodically to be returned, unused, to the manufacturer for a fresh replacement. These regularly recurring returns and replacements at relatively short intervals markedly increase the costs of supplying the product.

The present invention provides a simple and less expensive smallpox vaccine having a materially greater potency life than vaccines of this character as heretofore supplied. It provides a more stable product and one which eliminates entirely necessity for special or extraordinary low-temperature environment at any time, such refrigeration as is required being only of the same order as that customarily used for biological products generally. The vaccine of the present invention also utilizes a suspending medium which not only extends the period of viability of the virus, but also serves as the bactericidal agent for killing and inhibiting the growth of such bacteria as are normally present in such vaccines.

I have discovered that sterile, aqueous, hypertonic solutions of sodium chloride, potassium chloride and ammonium chloride, when employed as the suspending media for the smallpox vaccine pulp have a virus viability-supporting level of substantially twice the duration of that of the glycerinated diluent. Additionally, these hypertonic salt solutions per se are sufficiently active germicidally as to render unnecessary any other germicidal additive such as phenol or the like to destroy or inhibit the contaminating bacteria normally present in such vaccine products.

Moreover, and surprisingly, I have discovered that by using the above-mentioned suspending media not only is the virus viability-preservation doubly extended, but no special low-temperature requirements are imposed in order to enable or maintain such potency life extension. The improved stable vaccine resulting from the use of such sterile, hypertonic salt solutions may be shipped in the usual manner along with other biologicals and without any special attention to the prevailing temperatures during transit. Similarly, they may be stored at the normal +5° C. temperature generally used for such biologicals.

The following represents one example of a vaccine of the character described, compounded in accordance with my discovery, the parts being recited by volume:

1 part of smallpox vaccine pulp is placed in a mixing jar into which there are added 4 parts of sterile, aqueous 10 percent (i. e., weight-volume) sodium chloride solution. The solution and pulp are thoroughly mixed for a sufficient length of time to insure that the pulp is thoroughly ground, dispersed and suspended in the solution, the grinding and mixing being accomplished by a "Waring Blendor" or similar grinding apparatus. Following this, the vaccine is dispensed into individual containers for potency tests preparatory to shipment to the trade.

Either potassium chloride or ammonium chloride may be substituted in identical proportion for the sodium chloride in the example above given and the same steps followed in the preparation of the improved vaccine. Tests in which the concentration of the salt in the viability-preserving solution has been varied from about 5 to about 40 percent, prove such to be the effective limits for producing a vaccine satisfactory to the accomplishment of the intended purpose.

I claim:

1. A stable smallpox vaccine for topical application to a scarified skin area, said vaccine being composed of a minor portion of smallpox vaccine pulp thoroughly ground, dispersed and suspended in a major portion of a sterile, aqueous solution of a member of the group consisting of sodium chloride, potassium chloride and ammonium chloride in a concentration of not less than five percent.

2. A stable smallpox vaccine for topical application to a scarified skin area, said vaccine being composed, by volume, of about 1 part smallpox vaccine pulp thoroughly ground, dispersed and suspended in about 4 parts of a sterile, aqueous solution of a member of the group consisting of sodium chloride, potassium chloride and ammonium chloride in a concentration of from 5 to about 40 percent.

3. A stable smallpox vaccine for topical application to a scarified skin area, said vaccine being composed, by volume, of about 1 part smallpox vaccine pulp thoroughly ground, dispersed and suspended in about 4 parts of a sterile, aqueous 10 percent (weight-volume) sodium chloride solution.

4. A stable smallpox vaccine for topical application to a scarified skin area, said vaccine being composed, by volume, of about 1 part smallpox vaccine pulp thoroughly ground, dispersed and suspended in about 4 parts of a sterile, aqueous 10 percent potassium chloride solution.

5. A stable smallpox vaccine for topical application to a scarified skin area, said vaccine being composed, by volume, of about 1 part smallpox vaccine pulp thoroughly ground, dispersed and suspended in about 4 parts of a sterile, aqueous 10 percent ammonium chloride solution.

6. A stable smallpox vaccine for topical application to a scarified skin area, said vaccine being composed, by volume, of about 1 part smallpox vaccine pulp thoroughly ground, dispersed and suspended in about 4 parts of a sterile, aqueous, 10 percent (weight/volume) solution of a member of the group consisting of sodium chloride, potassium chloride, and ammonium chloride.

References Cited in the file of this patent

FOREIGN PATENTS 461,000 Great Britain ___________ Feb. 1, 1937

OTHER REFERENCES

Dick et al.: J. Infectious Diseases, vol. 57, 1935, p. 164.

Science—Supplement, vol. 74, No. 1919, October 9, 1937, pp. 10 and 12.

Moriyama: The Journal of the Shanghai Science Institute, sec. IV, vol. 3, pages 217–229, July 1938.

Moriyama: Chem. Abst. 4288, vol. 33, 1939.

Smadel et al.: Bacteriological Reviews, vol. 6, 1942, pp. 79–81 and 86.

Miller: J. Exp. Med., 1944, vol. 80, pages 518–520.

Annual Review of Biochem., vol. XV, 1946, p. 581.

Zinsser's "Text-book of Bacteriology," pub. 1948 by Appleton-Century-Crofts, Inc., N. Y. C., pp. 694 and 696.

Zinsser's Textbook of Bacteriology, pub. 1948 by Appleton-Century-Crofts, Inc., N. Y. C., pp. 682, 711–717.

Lo Grippo: Proc. Soc. Exp. Biol. and Med., May 1950, vol. 74, p. 208.

Annual Review of Microbiology, vol. 5, 1951, p. 272.

Collier: Bacteriological Reviews, vol. 18, pages 74–86, pub. March 1954.